(12) United States Patent
Sikora et al.

(10) Patent No.: US 7,331,419 B2
(45) Date of Patent: Feb. 19, 2008

(54) DUAL-CIRCUIT STEER-BY-WIRE STEERING SYSTEM COMPRISING A COMMON CRADLE

(75) Inventors: Karsten Sikora, Wegberg (DE); Jochen Horwath, Unteerensingen (DE)

(73) Assignee: ThyssenKrupp Presta Steertec GmbH (DE)

( * ) Notice: Subject to any disclaimer, the term of this patent is extended or adjusted under 35 U.S.C. 154(b) by 520 days.

(21) Appl. No.: 10/498,619

(22) PCT Filed: Dec. 4, 2002

(86) PCT No.: PCT/EP02/13726

§ 371 (c)(1),
(2), (4) Date: Jun. 10, 2004

(87) PCT Pub. No.: WO03/053765

PCT Pub. Date: Jul. 3, 2003

(65) Prior Publication Data

US 2005/0103559 A1 May 19, 2005

(30) Foreign Application Priority Data

Dec. 11, 2001 (DE) ................................. 101 60 764

(51) Int. Cl.
  *B62D 5/06* (2006.01)
  *B62D 5/10* (2006.01)
(52) U.S. Cl. ...................... 180/439; 180/403; 180/434; 180/437

(58) Field of Classification Search ................ 180/403, 180/434, 437, 439; 440/53, 61 S; 114/150
See application file for complete search history.

(56) References Cited

U.S. PATENT DOCUMENTS 2,855,065 A * 10/1958 Lucien .................. 180/437

(Continued)

FOREIGN PATENT DOCUMENTS

CH 412 625 11/1966

(Continued)

*Primary Examiner*—Lesley D. Morris
*Assistant Examiner*—Daniel Yeagley
(74) *Attorney, Agent, or Firm*—Robert W. Becker & Associates; Robert W. Becker (57) ABSTRACT

The invention relates to a steer-by-wire steering system comprising a hydraulic control unit that acts on the steerable wheels (1, 20), the control unit having at least one cradle (4, 23), which is displaceably mounted on at least one guide rod (5, 24) that passes through the respective cradle (4, 23). The respective cradle (4, 23) and the corresponding guide rod(s) (5, 24) form working chambers ($A_{11}$, $A_{12}$, $A_{21}$, $A_{22}$) of a piston-cylinder system, whereby each respective guide rod (5, 24) has at least one channel ($KA_{11}$, $KA_{12}$, $KA_{21}$, $KA_{22}$), each terminating in the vicinity of a working chamber ($A_{11}$, $A_{12}$, $A_{21}$, $A_{22}$). The cradle or cradles (4, 23) adjust the steerable wheels (1, 20) directly or by means of steering tie rods (2, 21).

28 Claims, 5 Drawing Sheets

U.S. PATENT DOCUMENTS

| | | | |
|---|---|---|---|
| 2,930,631 A * | 3/1960 | Voorhees, Sr. | 280/445 |
| 4,568,292 A * | 2/1986 | Hall | 440/61 R |
| 5,002,510 A * | 3/1991 | Rump | 440/61 R |
| 5,031,562 A * | 7/1991 | Nakase et al. | 114/150 |
| 5,471,907 A * | 12/1995 | Kobelt | 91/368 |
| 6,202,781 B1 * | 3/2001 | Ima | 180/252 |
| 7,025,168 B2 * | 4/2006 | Wigdahl et al. | 180/436 |
| 7,150,664 B1 * | 12/2006 | Uppgard et al. | 440/53 |
| 2004/0259437 A1 * | 12/2004 | Gai | 440/61 S |
| 2005/0164572 A1 * | 7/2005 | Sasayama et al. | 440/61 S |

FOREIGN PATENT DOCUMENTS

| | | |
|---|---|---|
| EP | 1 046 570 | 10/2000 |
| GB | 2 275 662 | 9/1994 |
| JP | 59 20773 | 2/1984 |

* cited by examiner

DUAL-CIRCUIT STEER-BY-WIRE STEERING SYSTEM COMPRISING A COMMON CRADLE

BACKGROUND OF THE INVENTION

The present invention relates to a steer-by-wire steering system, comprising a hydraulic control unit that acts on the steerable wheels.

The control units of generic dual-circuit steer-by-wire steering systems normally consist of two control cylinders, which are individually mounted on their own and which need flexible feed lines to supply the fluid medium. Due to their structure the control cylinders are normally bulky and prone to fault on account of the flexible feed lines.

Object of the present invention is to create a steer-by-wire steering system, the structure of which is as compact and as non-prone to fault as possible.

SUMMARY OF THE INVENTION

This object is achieved according to the invention with a steer-by-wire steering system wherein the control unit has at least one cradle, which is adapted to adjust the steerable wheels directly or via tie rods, wherein the at least one cradle is displaceably mounted on at least one guide rod, which in particular passes through a respective one of the at least one cradle, which, together with the at least one pertaining guide rod, form working chambers of a piston-cylinder system, wherein the at least one guide rod is a tube and has at least one channel, which respectively ends in a vicinity of one of the working chambers, wherein a first channel is formed by the tube itself, wherein an inner tube is disposed in the first channel and has an outer diameter that is less than the inner diameter of the first channel, and wherein the inner tube forms a second channel.

The steer-by-wire steering system in accordance with the invention is distinguished in that as a result of fixed guide rods, which in particular are secured directly to the vehicle bodywork or valve blocks, a large degree of flexural rigidity of the steering system is obtained, since the guide rods employed have a greater diameter in relation to the piston rod used in conventional control cylinders. A cradle is displaceably mounted on the guide rods of the steer-by-wire steering system in accordance with the invention, whereby the cradle as well as the guide rods form working chambers of a piston-cylinder system. It is within the sense of the invention to use only one guide rod or however also several guide rods for the steering system in accordance with the invention. It is likewise within the sense of the invention that all guide rods form piston-cylinder systems with the cradle or cradles. However it is also possible that a minimum of one guide rod is provided, which only fulfills the cradle-guiding function, but does not form a piston-cylinder system.

Generally, the arrangement of the piston guide rods on the motor vehicle is arbitrary. Advantageously, the guide rods are arranged transversally to the driving direction and parallel to the roadway. However, it is also completely possible to arrange the guide rods in another direction on the vehicle.

If more than one guide rod is present, these are preferably arranged parallel to each other at the same height. However, it is also possible that the guide rods are arranged one above the other and parallel to each other. The point of application of force of the steering tie rods on the cradle(s), which is/are displaceably mounted on the guide rods, is to be selected as a function of the given installation space. Advantageously, the points of application of force of the steering tie rods of both guided wheels are to be selected in such a way that they lie centrally between two parallel guide rods, so that no torque acts upon the guide rods. As a result of this central application of force it is in particular possible to provide long guide rods, which advantageously leads to minimum steering error when the springs are compressed and released. One or more long guide rods can also be used, whereby in addition a central steering tie rod links the two points of application of force of the two steering tie rods with one another. This central steering tie rod is to be arranged parallel to the guide rod(s). Advantageously, it is displaceably mounted on the bodywork parallel to the guide rod(s), whereby advantageously no flexural stress acts upon the steering tie rods.

Because the link with the vehicle framework occurs far on the outside due to the long guide rods, a more rigid connection of the guide rod-cradle system arises. Advantageously, the steer-by-wire steering system in accordance with the invention has a modular construction. Thus, it is possible to place the guide rods between two valve blocks. Depending on the type of motor vehicle, the valve blocks and/or the guide rod-cradle system can be selected accordingly, whereby standard modules can be used for different types of motor vehicle.

Because the guide rods themselves form the line for the fluid medium, advantageously no additional connecting hoses are necessary as in the case of conventional steering systems, so that advantageously less risk of leakage results.

If two guide rods are used, each of which on their own form feed lines to working chambers of piston-cylinder systems, each guide rod is in itself a component of a steering circuit, whereby the two steering circuits can be implemented purely as a dual-circuit or in addition, in some case as a mono-circuit, that is to say for example with a common pump. In principle, the steer-by-wire steering system in accordance with the invention can be wired similarly to all known steering circuit wiring. The two steering circuits, for example, can possess valves having open or closed center. However, it is also possible that a steering circuit is dimensioned as far as the level of force is concerned, in such a way that it alone can apply the steering force when the motor vehicle is being driven in normal operation. The second steering circuit then serves as a reserve, which is activated either in the event of failure of the first steering circuit or however if necessary, for example in parking and/or shunting operation, when high steering force is necessary.

As already stated, if the above-described steer-by-wire steering system is used in this way, the control valves fitted in the steering circuits can be valves having open or closed center. The use of valves having closed center with simultaneous use of an accumulator has the advantage that the pump does not have to be in continuous operation in order to build up a working pressure of the fluid medium, whereby advantageously energy and thus fuel are saved.

As also already stated, the cradle in the case of the steer-by-wire steering system in accordance with the invention can be configured both with tandem and single cylinders. In the case of the tandem cylinder, the working chambers of the piston-cylinder systems of each steering circuit are arranged beside each other in the axial direction and are separated from one another by gaskets. If only one guide rod and one cradle and/or single cylinder is used, the working chambers of both steering circuits are arranged beside each other and/or one behind the other in the axial direction. Therefore a relatively small dimensional size results, whereby however the cradle and/or the control cylinder, which encompasses the guide rod from outside, is longer than the control cylinders of the tandem system.

Brief Description of the Drawings

Embodiments of the steer-by-wire steering system in accordance with the invention are described in detail below with reference to figures.

There is shown.

Description of Specific Embodiments

Figure 1:
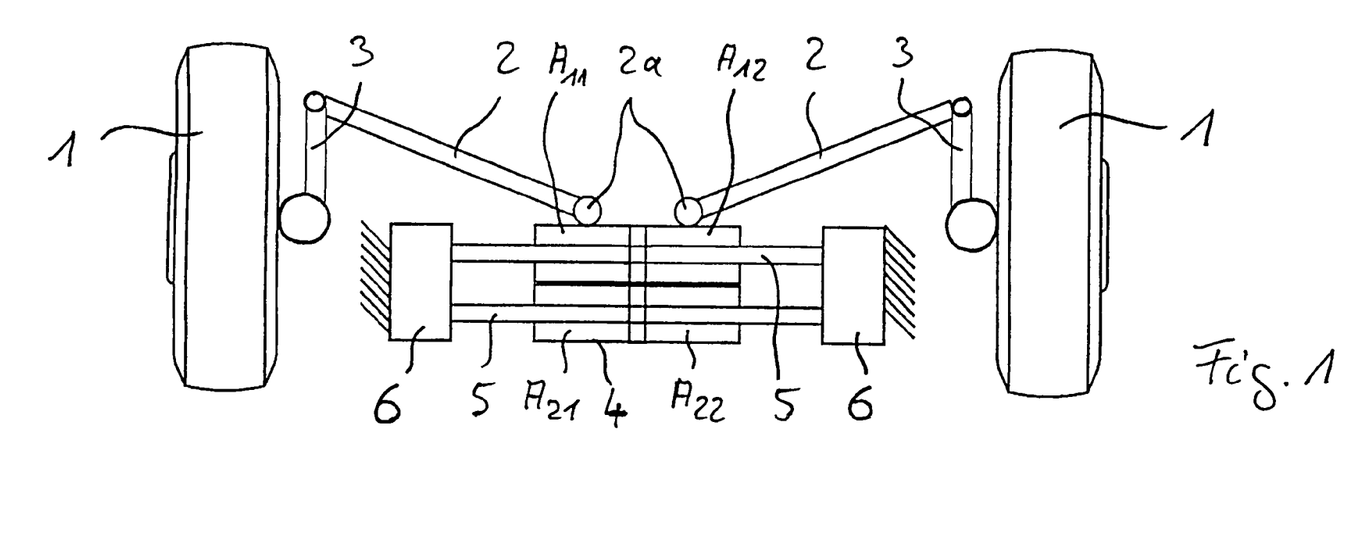
FIG. 1 a schematic illustration of a steer-by-wire steering system in accordance with the invention.

FIG. 1 shows a schematic illustration of a first embodiment of the steer-by-wire steering system in accordance with the invention, whereby a cradle 4, which is movably and/or displaceably mounted on two guide rods 5, adjusts steerable wheels 1 by means of steering arms 3 and steering tie rods 2. The cradle 4 together with the guide rods 5 forms four working chambers $A_{11}$, $A_{12}$, $A_{21}$, and $A_{22}$. The guide rods 5 are rigidly mounted on the bodywork or chassis of the vehicle between two valve blocks 6. The cradle 4 and the guide rods 5 form a special piston-cylinder system in which the kinetics are reversed, since here the piston and/or the guide rod(s) are static and the cylinder and/or cradle moves.

Figure 2:
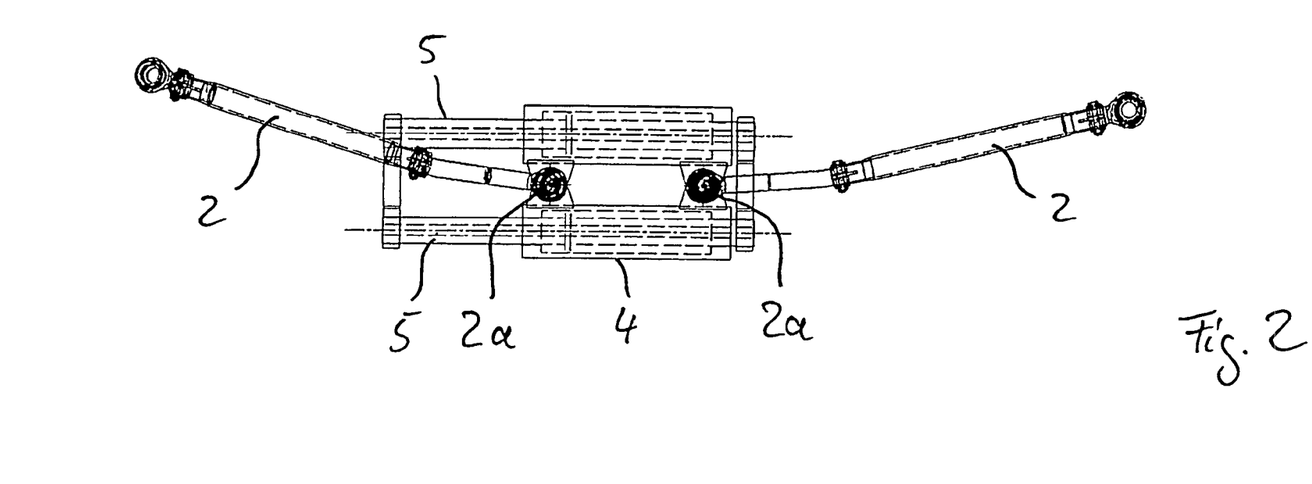
FIG. 2 a dual-circuit steer-by-wire steering system with centrally acting steering tie rods.

FIG. 2 shows a further embodiment of the steer-by-wire steering system in accordance with the invention, in which the points of application of force 2a of the steering tie rods 2 are arranged on the cradle 4 centrally between the two guide rods 5. As a result of the central arrangement of the points of application of force 2a to the guide rods 5 minimum stress on the cradle 4 arises, as a result of which the construction of this embodiment does not need to be so substantial.

Figure 3:
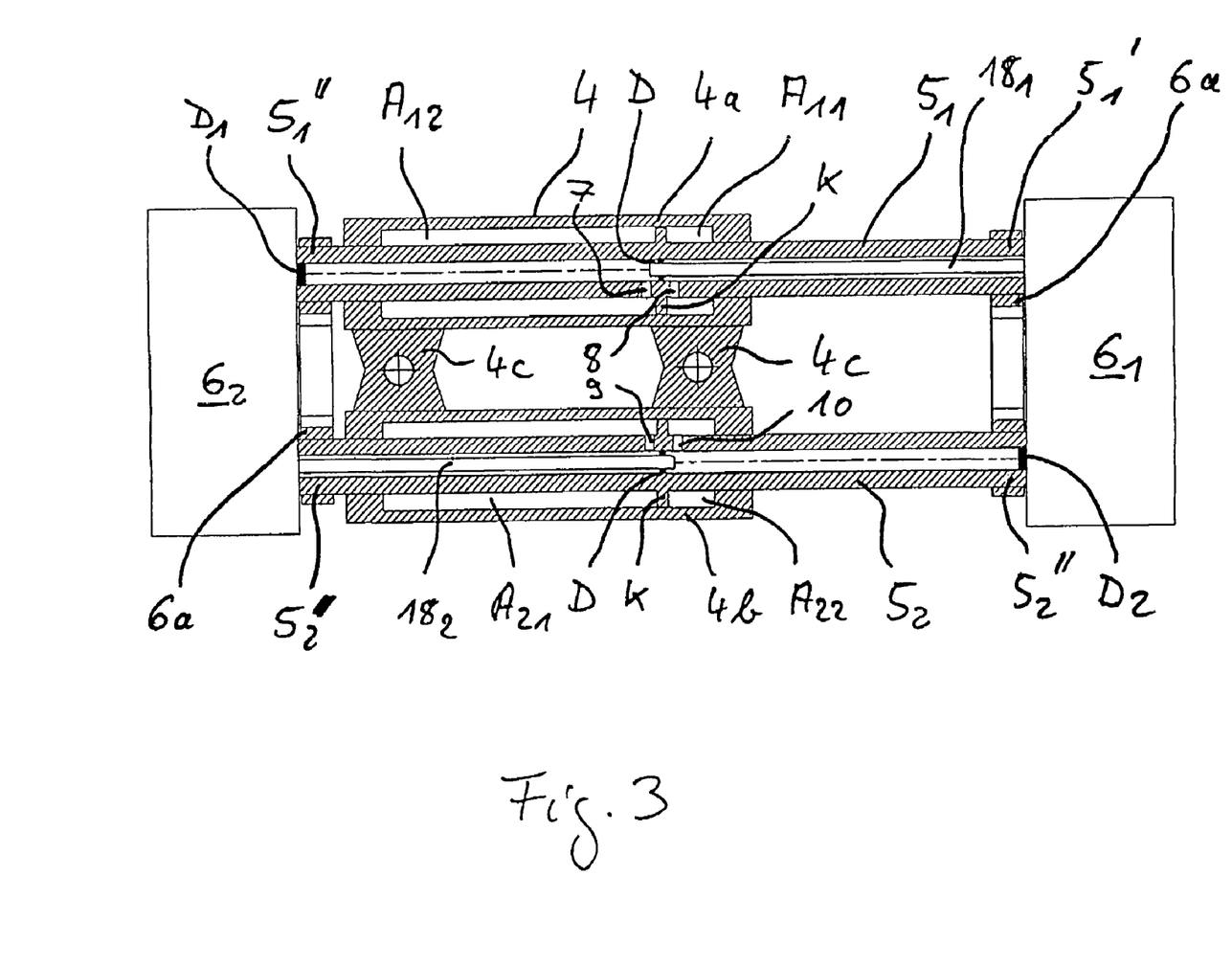
FIG. 3 a sectional view through a steer-by-wire steering system in accordance with FIG. 2.

FIG. 3 shows a cross sectional view of the piston-cylinder system in accordance with the embodiment of FIG. 2. The guide rods $5_1$ and $5_2$ are mounted between the valve blocks $6_1$ and $6_2$. The cradle 4 comprises two cylinders 4a and 4b, which are rigidly connected with one another by means of intermediate parts 4c. The guide rods $5_1$ and $5_2$ are placed between the valve blocks $6_1$ and $6_2$. The free ends $5'_1$ and $5''_1$, $5'_2$ and $5''_2$ are secured by means of fastening parts 6a to the valve blocks $6_1$ and $6_2$, in particular with their ends screwed into the valve blocks. The guide rods $5_1$ and $5_2$ are formed as tubes, which advantageously have a circular cross section for outside and inside diameters. However, it is also possible to select any cross-sectional shape. Nevertheless, it is to be ensured here that a possible simple and durable seal must be guaranteed between the guide rods and the cradle. By selecting a circular cross section it is possible that the cavity of each cylinder 4a, 4b can be produced for example by means of a borehole or however is formed by a simple tube. The guide rods $5_1$ and $5_2$ also have continuous cavities. The cavities can be realized by means of boreholes. However, it is equally possible to use a tube as a guide rod.

In each case, an inner tube $18_1$, $18_2$ is inserted from one end in the cavity of each guide rod $5_1$, $5_2$. The end $5''_1$ and $5''_2$ of each guide rod $5_1$, $5_2$ is closed in each case by means of a seal $D_1$ and/or $D_2$, so that the medium flowing through the inner tube $18_1$ and/or $18_2$ inside the guide rod $5_1$ and/or $5_2$ into the respective working chamber $A_{12}$ and/or $A_{22}$ cannot escape from the guide rod $5_1$ and/or $5_2$ or from the piston-cylinder system. The inner tubes $18_1$ and/or $18_2$ in each case on their end inside the cavity are encompassed by a seal D, which seals the inner tube $18_1$ and/or $18_2$ against the inner wall of the guide rod $5_1$ and/or $5_2$ and thus divides the interior of the guide rods $5_1$ and/or $5_2$ into two sub-areas. The guide rod has window-like orifices 7, 8, 9 and 10, which connect the feed and/or extraction lines with the working chambers $A_{11}$, $A_{12}$, $A_{21}$ and $A_{22}$.

Should the cradle 4 be moved from left to right, a pressure can be built up either in the working chamber $A_{11}$ or in the working chamber $A_{22}$. Thus, it is within the sense of the invention to apply fluid pressure to both cylinders at the same time. Likewise, it is within the sense of the invention, and this also applies for all embodiments illustrated, that the cylinder 4a together with the guide rod $5_1$ is a component of a first steering circuit and the cylinder 4b as well as the guide rod $5_2$ is a component of a second steering circuit. As already described, both steering circuits can operate in parallel. However, it is also possible that the first steering circuit is provided for normal driving and is dimensioned accordingly as far as its level of force is concerned, whereby the second steering circuit is only activated to assist the first steering circuit, for example during parking and/or shunting operation. If the first steering circuit should fail, the second steering circuit provides a fall back level, as a result of which the vehicle can continue to be steered safely.

Figure 4:
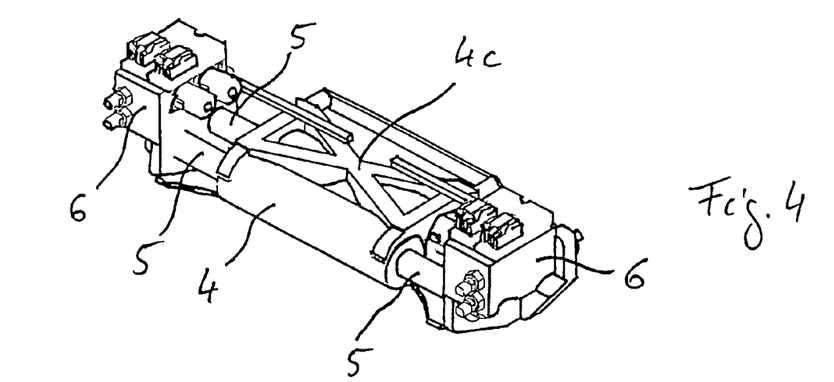
FIG. 4 a perspective view of a steer-by-wire steering system in accordance with the invention.

FIG. 4 shows a perspective view of a steering system in accordance with the invention with two guide rods 5 arranged in parallel, on which two cylinders are rigidly connected with one another by means of intermediate parts 4c, which together form a cradle 4. The guide rods 5 are placed between two valve blocks 6. The valve blocks 6 correspond to the valve blocks $6_1$ and $6_2$ schematically illustrated in FIG. 3.

Figure 5:
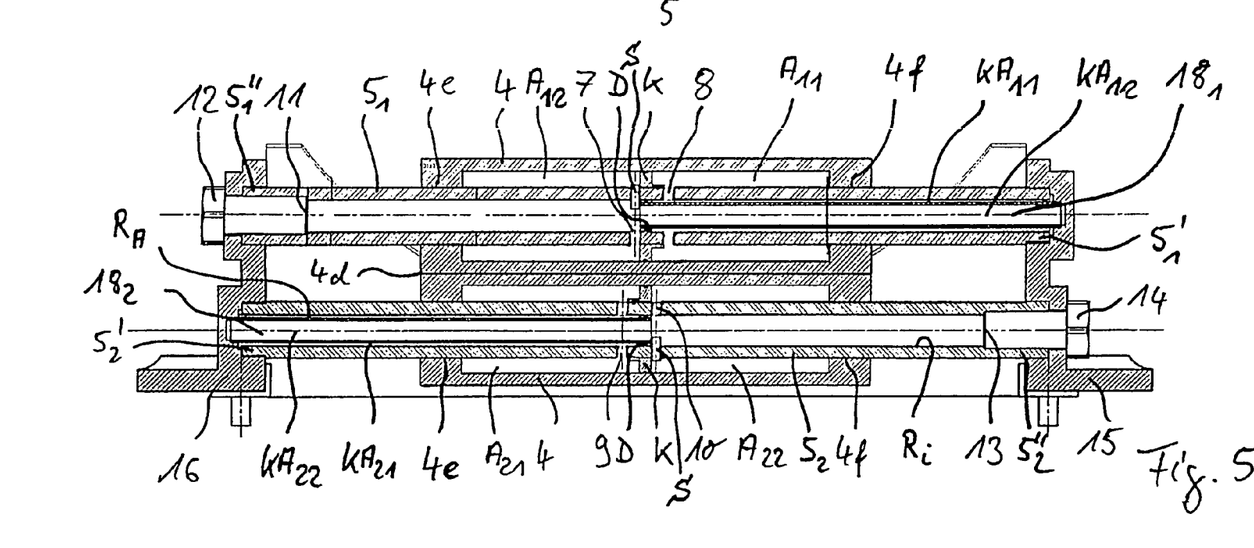
FIG. 5 a view of the feed lines of the dual-circuit steer-by-wire steering system in accordance with FIGS. 1 to 4.

With FIG. 5 once again the specific structure of the piston-cylinder system is described, whereby the general structure corresponds to that of FIG. 3, the difference being that the cylinders 4 are connected directly, (shown by 4d). that is to say without intermediate elements (4c). The guide rods 5 are formed as tubes, which are held parallel to each other by means of fastening parts 15, 16. The free ends $5''_1$, $5''_2$ are closed by means of screw plugs 12, 14 and inlaid gaskets 11, 13, so that no fluid medium can escape at these ends. The screw plugs 12 and/or 14 press the guide rods $5_1$ and $5_2$ with their free ends $5'_1$, $5'_2$ into the respective cylinder block. As a result, a sure and durable connection between the guide rods with their channels and the valve blocks results. It is, however, equally possible in an alternative embodiment to screw the ends $5'_1$ and $5'_2$ of the guide rods with the valve blocks. The fluid medium is pumped through the opposite free ends of the guide rods $5_1$ and $5_2$ into the channels $KA_{11}$ and $KA_{21}$ formed by the guide rods $5_1$ and $5_2$ towards the working chambers $A_{11}$ and $A_{21}$ and/or let out from these. The channels $KA_{11}$ and $KA_{21}$ are formed by the inner wall of the guide rod $5_1$ and/or $5_2$ and the inner tube $18_1$ and/or $18_2$. The channels $KA_{11}$ and $KA_{21}$ are connected via window-like orifices 8, 9 with the associated working chambers $A_{11}$ and $A_{21}$. The channels $KA_{12}$ and $KA_{22}$ are formed by the inner tubes $18_1$ and/or $18_2$. The channels $KA_{11}$ and $KA_{12}$ or $KA_{21}$ and $KA_{22}$ in each case are sealed by a seal D, which encompasses or spans the final area of the inner tube $18_1$ and/or $18_2$ and lies against its outer wall and at the same time against the inner wall of the guide rod $5_1$ and/or $5_2$. The channels $KA_{12}$ and $KA_{22}$ are connected with the associated working chambers $A_{12}$ and $A_{22}$ via window-like orifices 7, 10. The ratio between inner diameter $R_1$ of the guide rods $5_1$ and/or $5_2$ and outer diameter $R_4$ of the inner tubes $18_1$ and/or $18_2$ is to be dimensioned such that the flow cross-sections are roughly the same size or are suitable for the respective demands. The cylinders 4 lie with their end areas 4e, 4f sealingly outwards on the guide rod $5_1$ and/or $5_2$, so that no fluid medium can escape from the working chambers into the environment. The working chambers $A_{11}$ and $A_{12}$ or $A_{21}$ and $A_{22}$ of the first and second steering circuit in each case are separated from one another by a circular part K, which in particular can be molded in the shape of a collar outside on the guide rod $5_1$ and/or $5_2$. So that the inner tube $18_1$ and/or $18_2$ cannot be pushed too far into the guide rod $5_1$ and/or $5_2$ stop elements S are to be provided. The stop elements S in particular can be inserted or screwed into a window-like orifice and/or borehole of the guide rods $5_1$ and/or $5_2$.

Figure 6:
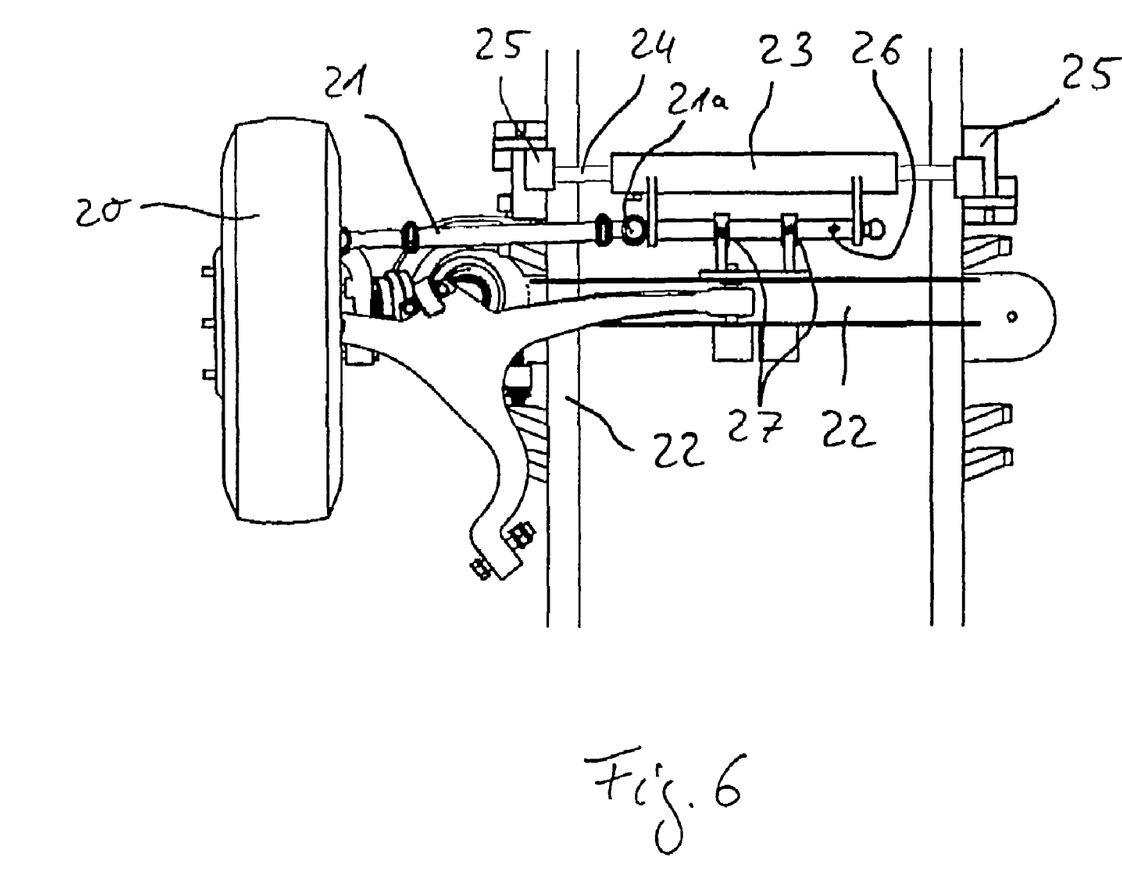
FIG. 6 a detailed illustration of a steer-by-wire steering system in accordance with the invention with only one guide rod.
Figure 7:
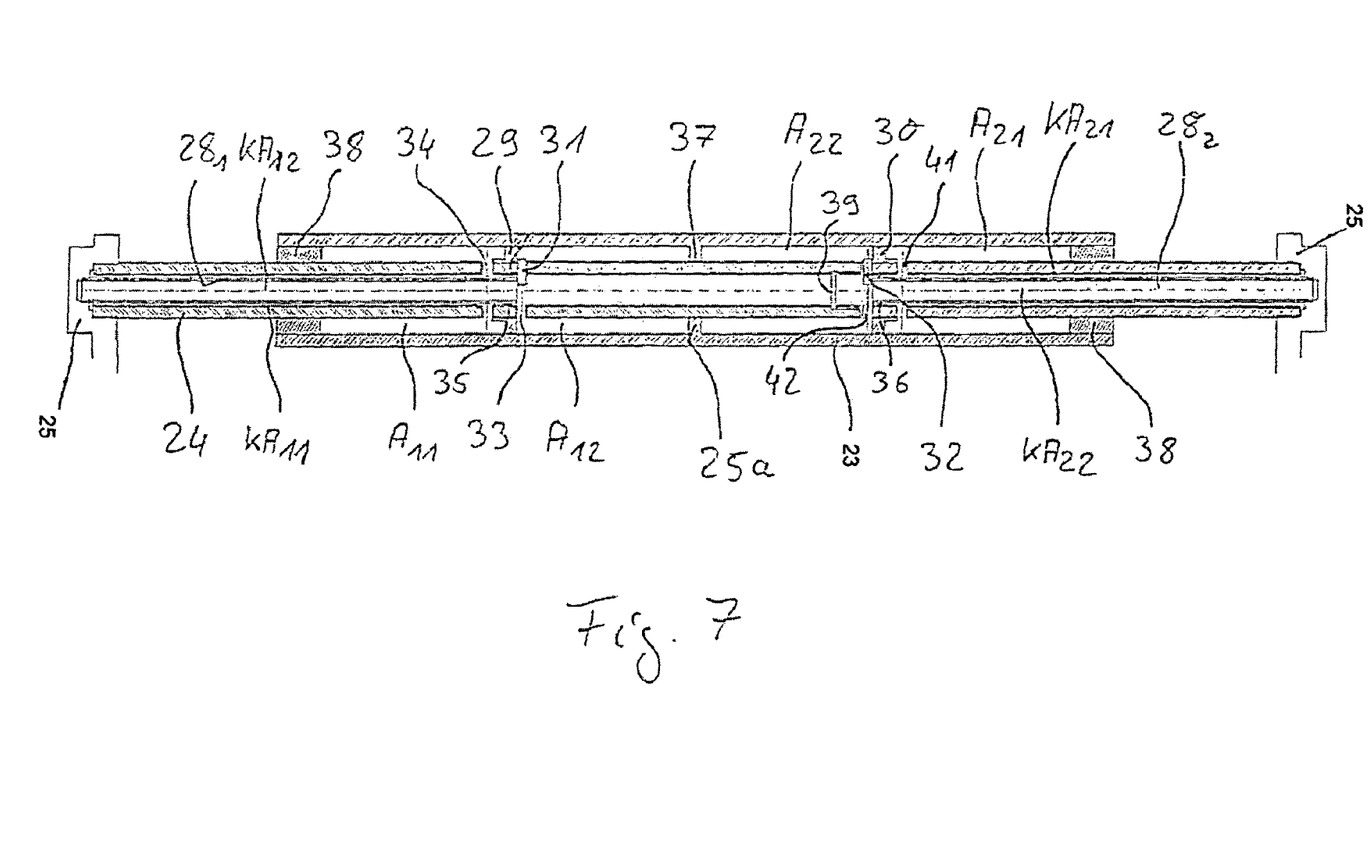
FIG. 7 a cross sectional view through the piston-cylinder system of the steer-by-wire steering system in accordance with FIG. 6.

FIG. 6 shows an alternative embodiment of a dual-circuit steer-by-wire steering system in accordance with the invention, whereby only one steered wheel 20 is illustrated, which can be moved by means of a steering tie rod 21, which is linked via the joint 21a to a central guide rod 26. The central guide rod 26 is rigidly connected with a cradle 23, which in turn is displaceably mounted on a guide rod 24. The guide rod 24 is mounted between two valve blocks 25, which are connected with the vehicle chassis 22. The central steering tie rod 26 is displaceably mounted parallel to the guide rod 24 by means of sliding bearings 27 on the chassis 22. As a result of the oblong arrangement of the cradle 23 the guide rod 24, which is smaller as far as its diameter is concerned, is relatively resistant to bending, so that the fastening points of the guide rod 24 can be arranged relatively far on the outside and therefore directly on the chassis 22. FIG. 7 shows the piston-cylinder system in accordance with the embodiment of FIG. 6 in cross section. The guide rod 24 with its two ends lies in two valve blocks 25 whereby fluid medium can flow into the channels $KA_{11}$, $KA_{12}$, $KA_{21}$ and $KA_{22}$ through the valve blocks 40 and/or flow out from these. Two inner tubes $28_1$ and $28_2$ are each inserted from one end of the tube 24 into this and lie with their ends inserted in the tube 24 against stop elements 31, 32. The free ends of the inner tubes $28_1$ and $28_2$ are encompassed by circular gaskets 35, 36, which lie sealingly against the outer wall of the inner tubes $28_1$, $28_2$ and the inner wall of the tube 24. These gaskets separate the channels of one steering circuit respectively from one another. The channels $KA_{12}$ and $KA_{22}$ are separated sealingly from one another by a gasket 39 inlaid in the tube 24. The guide rod and/or the tube 24 have window-like orifices 33, 34, 41 and 42, through which the channels $KA_{11}$, $KA_{12}$, $KA_{21}$ and $KA_{22}$ are connected with the working chambers $A_{11}$, $A_{12}$, $A_{21}$ and $A_{22}$. The displaceably mounted cylinder and/or cradle 23 encompasses the guide rod and/or the tube 24 and with this together forms the working chambers. The ends of the cylinder 23 are closed by means of gaskets 38, so that no fluid medium can escape from the working chambers $A_{11}$ and $A_{21}$ into the environment. The working chambers $A_{12}$ and $A_{22}$ are separated from one another by means of a collar 25a and associated gasket 37 arranged on the cylinder 23. The working chambers $A_{11}$ and $A_{12}$ are separated from one another by a circular and/or collar-shaped part 29 and associated gasket. For assembly, the part 29 can be pushed from the end onto the tube 24 and can be then connected captively with the tube 24. However, it is also possible to mold this collar-shaped part on the tube 24. Likewise, the working chambers $A_{21}$ and $A_{22}$ are separated from one another by means of a separating element 30 and associated gasket. The separating elements 29, 30 are rigidly fastened to the tube 24, whereas the partition 25a is displaced with the cylinder 23.

Of course it is possible that the parts forming the cylinders are not produced integrally, for example from a tube and/or a cylinder, but are formed from two or several parts. Thus, it is possible, for example, to form the cylinder by means of two half shells, whereby gaskets are to be provided between the two parts.

Generally, the connection of the channels formed by the guide rods and inner tubes on the fluid circuit of the respective steering circuits, can be configured arbitrarily. Of course, it is possible to deviate from the embodiments described specifically and yet make use of the inventive idea. Thus, a guide rod can also be formed from two or several parts, if this is necessary for easier assembly. The individual parts forming a guide rod can for example be inserted into one another or screwed together or fastened or connected with one another in any other way. The same applies for the parts forming the cylinders and the cradle as a whole.

The specification incorporates by reference the disclosure of PCT/EP02/1 3726 filed Dec. 4, 2002 and German priority document 101 607 64.4 filed Dec. 11, 2001.

The present invention is, of course, in no way restricted to the specific disclosure of the specification and drawings, but also encompasses any modifications within the scope of the appended claims.

The invention claimed is:

1. A steer-by-wire system comprising:
   a hydraulic control unit that acts on steerable wheels 1, wherein said control unit has at least one cradle which is adapted to adjust said steerable wheels directly or via tie rods;
   at least one guide rod, wherein said at least one cradle is displacebly mounted on said at least one guide rod, which in particular passes through a respective one of said cradles, wherein said at least one cradle together with said at least one pertaining guide rod, form working chambers of a piston-cylinder system, wherein said at least one guide rod is a tube and has at least one channel which respectively ends in a vicinity of one of said working chambers, wherein a first channel is formed by said tube itself; and
   an inner tube disposed in said first channel, wherein said inner tube has an outer diameter that is less than an inner diameter of said first channel, and wherein said inner tube forms a second channel.

2. A steer-by-wire steering system according to claim 1, wherein a plurality of cradles are provided that are rigidly connected with one another directly or by means of at least one intermediate part and form a single cradle.

3. A steer-by-wire steering system according to claim 1, wherein a given one of said at least one guide rod is provided with a plurality of channels that extend from one or both end faces or regions of said guide rod into said guide rod.

4. A steer-by-wire steering system according to claim 1, wherein said at least one guide rod is secured or mounted on a vehicle chassis directly or by means of intermediate parts.

5. A steer-by-wire steering system according to claim 1, wherein said at least one guide rod is disposed between two valve blocks and wherein at least one of said channels and feed lines of said at least one guide rod are in operative communication with valves of at least one of said valve blocks.

6. A steer-by-wire steering system according to claim 5, wherein two guide rods are disposed parallel to one another between two valve blocks and pass through a cradle wherein respective channels of said two guide rods are respectively in operative communication with only one valve block, wherein said cradle with each guide rod, forms working chambers of a piston-cylinder system, and wherein each guide rod, together with the working chambers formed thereby and the associated valve block, form a separate steering circuit.

7. A steer-by-wire steering system according to claim 6, wherein a respective guide rod is surrounded by a cylinder end faces of which respectively rest in a sealing manner against pertaining ones of said guide rods, and wherein two cylinders are provided and are interconnected directly or via at least one connection part and form said cradle.

8. A steer-by-wire steering system according to claim 6, wherein points of application of force or mounting locations of said tie rods are disposed between said two guide rods in particular being centrally disposed relative to said guide rods.

9. A steer-by-wire steering system according to claim 6, wherein points of application of force or mounting locations of said tie rods are disposed adjacent to said two guide rods.

10. A steer-by-wire steering system according to claim 6, wherein said at least one guide rod is a tube having an inner diameter that forms said first channel and in an interior of which is disposed said inner tube having an outer diameter that forms said second channel, wherein both of said channels are operatively connected with the same valve block, and wherein a gasket sealingly engages about a surface of said inner tube in a vicinity of a free end thereof and sealingly rests against an inner wall of said first channel of said guide rod.

11. A steer-by-wire steering system according to claim 10, wherein said gasket separates said first and second channels from one another and divides an interior of said guide rod into two regions.

12. A steer-by-wire steering system according to claim 11, wherein at least one window-like orifice is disposed in each wall of said guide rod and respectively connects a region with a working chamber.

13. A steer-by-wire steering system according to claim 11, wherein in a vicinity of said gasket said guide rod is provided with a peripheral, collar-shaped projection that separates the working chambers from one another.

14. A steer-by-wire steering system according to claim 1, wherein a guide rod that together with a carriage form working chambers is provided with at least one outwardly directed collar that in particular is formed thereon, wherein a given collar respectively separates two working chambers from one another.

15. A steer-by-wire steering system according to claim 1, wherein a guide rod formed by an outer tube passes through said cradle wherein disposed in said outer tube are two inner tubes that respectively extend from an end face into said outer tube, wherein a gasket divides an interior of said outer tube into two partial chambers that are separated from one another, and a respective annular gasket which is disposed between an inner tube and said outer tube, seals the two channels formed by said outer tube and said inner tube from one another, and wherein said outer tube is provided with window-like orifices that connect the channels with the working chambers that are formed by said outer tube and said cradle.

16. A steer-by-wire steering system according to claim 15, wherein said cradle is provided with a tubular part through which said outer tube passes, and wherein gaskets disposed between said tubular part and said outer tube seal the working chambers toward the outside.

17. A steer-by-wire steering system according to claim 15, wherein a respective collar which is disposed on said outer tube and is directed outwardly, separates said working chambers of a steering circuit from one another.

18. A steer-by-wire steering system according to claim 17, wherein said collar is formed on said outer tube or is formed by an additional annular part that is connected with said outer tube.

19. A steer-by-wire steering system according to claim 15, wherein an annular gasket and an inwardly directly collar that is disposed on a tubular portion of said cradle, separate two adjacent working chambers of two steering circuits from one another.

20. A steer-by-wire steering system according to claim 1, wherein an end of respective ones of said tie rods are rotatably mounted on said cradle.

21. A steer-by-wire steering system according to claim 1, wherein a central tie rod is disposed parallel to said cradle and is secured thereto or integrated therewith, wherein said central tie rod is displaceably mounted on a vehicle chassis parallel to said cradle, and wherein an end of respective ones of said tie rods are rotatably or pivotably mounted on said central tie rod.

22. A steer-by-wire steering system according to claim 1, wherein two steering circuits operate in parallel at the same time, and in particular an associated control valve is a valve having open center or closed center.

23. A steer-by-wire steering system according to claim 22, wherein a second steering circuit has a level of force that is the same or less than that of a first steering circuit.

24. A steer-by-wire steering system according to claim 1, wherein a level of force of a first steering circuit is dimensioned such that, with the exception of a parking or shunting operation of a vehicle being steered, applies sufficiently large forces for a normal driving operation.

25. A steer-by-wire steering system according to claim 1, wherein a second steering circuit takes over the function of the first steering circuit upon failure of said first steering circuit.

26. A steer-by-wire steering system according to claim 25, wherein a control valve of said first steering circuit is a valve having open center, and a control valve of said second steering circuit is a valve having closed center.

27. A steer-by-wire steering system according to claim 1, wherein said steering system is provided with additional guides for a mounting of said at least one cradle.

28. A steer-by-wire steering system according to claim 27, wherein at least one additional guide is a guide rod that passes through said cradle.

* * * * *